United States Patent
Fletcher et al.

[11] Patent Number: 6,077,373
[45] Date of Patent: Jun. 20, 2000

[54] MANUFACTURE OF MULTILAYER POLYMER FILMS

[75] Inventors: Eldon Lawrence Fletcher, Kingston; Anthony Joseph Cesaroni, Unionville; Rodney Martin, Toronto, all of Canada

[73] Assignee: Du Pont Canada Inc., Mississauga, Canada

[21] Appl. No.: 08/906,197

[22] Filed: Aug. 5, 1997

Related U.S. Application Data

[60] Provisional application No. 60/025,924, Sep. 11, 1996.

[51] Int. Cl.⁷ .................................................... B32B 31/20
[52] U.S. Cl. .................. 156/73.6; 156/209; 156/244.27; 156/308.2; 156/324; 264/175
[58] Field of Search ..................... 156/73.6, 209, 156/219, 220, 244.27, 324, 308.2; 264/175

[56] References Cited

U.S. PATENT DOCUMENTS

| | | | |
|---|---|---|---|
| 3,598,671 | 8/1971 | Wortman | 156/73.6 |
| 3,627,602 | 12/1971 | Dikj | 156/73 |
| 3,908,808 | 9/1975 | Busker | 100/35 |
| 3,960,636 | 6/1976 | Moffitt | 156/290 |
| 4,167,600 | 9/1979 | Benzaquen | 428/91 |

FOREIGN PATENT DOCUMENTS 0 677 368  10/1995  European Pat. Off. .

*Primary Examiner*—Sam Chuan Yao
*Attorney, Agent, or Firm*—Joel D. Citron; Richard H. Burgees

[57] ABSTRACT

A method for making multilayer polymer films with involves the use of preferably embossed rollers which oscillate oppositely with respect to each along their respective rotational axis. Multilayer film is made by passing two or more molten thermoplastic films through the nip of these rollers, thereby laminating the individual films together. The method is particularly useful for improving the adhesion between film layers, and/or when at least one of the layer is a liquid crystalline polymer. Such films are useful in packaging, multilayer containers and for circuit boards.

16 Claims, 2 Drawing Sheets

MANUFACTURE OF MULTILAYER POLYMER FILMS

This application claims the benefit of U.S. Provisional No. 60/025,924 filed Sep. 11, 1996.

FIELD OF THE INVENTION

This invention concerns a process for the preparation of a multilayer polymer film by feeding two or more films of molten polymer to rollers which oscillate along their axis with respect to another and whose surfaces are preferably slightly embossed, and wherein the temperature of the rollers is such that the film solidifies on one roller and forms a molten bead on the other roller. The resulting multilayer films have improved adhesion between layers.

TECHNICAL BACKGROUND

Multilayer films are important items of commerce, being particularly useful in packaging, where differing properties offered by various polymers of the film layers are important to the overall functioning of the film in use. The most common method of forming films from thermoplastics is extrusion of the polymer through a film die, and multiple layer films are typically formed by extruding each polymer needed separately, and either joining the individual films in the die or just outside the die, or extruding the various layers through individual dies and then laminating the layers together, or some combination of the two. One concern in the formation of such multilayer films is the adhesion between various layers, particularly when adjacent layers are made from polymers that are unlike each other. Various solutions, such as the use of separate tie ("adhesive") layers have been used, but these involve extra expense. Therefore better methods of making multilayer films are desired.

When LCPs are extruded into films (singly or in multilayer structures), the polymer usually is highly oriented in the machine (extrusion) direction (MD), and is weak and brittle in the transverse direction (TD). Special methods have been developed to produce LCP films (or thin tubes which can be slit into films) with more balanced MD/TD properties, thus improving the TD properties of the film. However, such methods, which for instance are described in U.S. Pat. Nos. 4,384,016, 4,820,466, 4,963,428, 4,966,807, 5,156,785, 5,248,305,288,529, 5,312,238, and 5,326,245 and G. W. Farrell, et al., Journal of Polymer Engineering, vol. 6, p. 263–289 (1986), usually require the use of intricate, expensive equipment which may be difficult to operate reliably, produce tubes which may not lay flat as films, and/or require labor intensive lay-up methods. One of these methods is moving in the TD an extrusion die surface which contacts the molten LCP. Thus better methods of preparing improved LCP films are needed.

SUMMARY OF THE INVENTION

This invention concerns, a process for the production of a multilayer thermoplastic film, comprising, feeding a molten first film of a first thermoplastic polymer and a molten second film of a second thermoplastic polymer to a pair of rollers which have a gap between them which is approximately equal to the total thickness of said first film and said second film, and passing said first film and said second film through said gap, provided that:

said rollers oscillate relative to one another and parallel to their rotational axis at a frequency of about 20 to about 200 Hz;

said rollers are at such a temperature or temperatures that said first film or said second film freezes against one roller, and on the other roller a rolling bank of molten polymer is formed;

and provided that at said temperature or temperatures and said frequency a multilayer thermoplastic film is formed.

In all of the Figures, motors and drives for rotating the rollers 5 and 6 are not shown, and neither are supports or bearings for 5 and 6 (except for 15 and 16), or means for heating 5 and 6.

Figure 2:
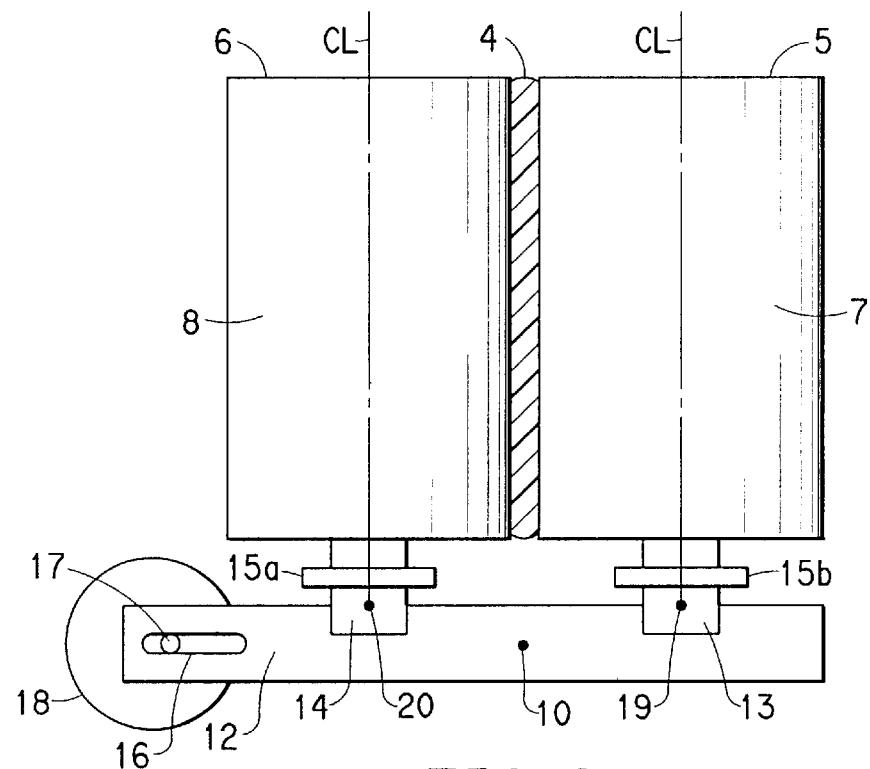
FIG. 2 shows the same rollers 5 and 6 and rolling bank 4 from the top, together with one method of oscillating the rollers 5 and 6 parallel to the axis (center line) of each of these rollers. Lever 9 is connected to a fixed point by pin 10, and to arms 13 and 14 by pins 19 and 20 respectively. The arms 13 and 14 are connected to rollers 5 and 6 respectively, through thrust bearings 15 and 16 respectively, allowing rollers 5 and 6 to rotate while being oscillated. Lever 9 contains slot 16 into which cam 17 is fitted. Motor 18 rotates cam 17 thereby causing lever 9 to oscillate approximately perpendicularly to the rotational axis of rollers 5 and 6. This causes 5 and 6 to oscillate in directions opposite to each other and parallel to their rotational axis.
Figure 3:
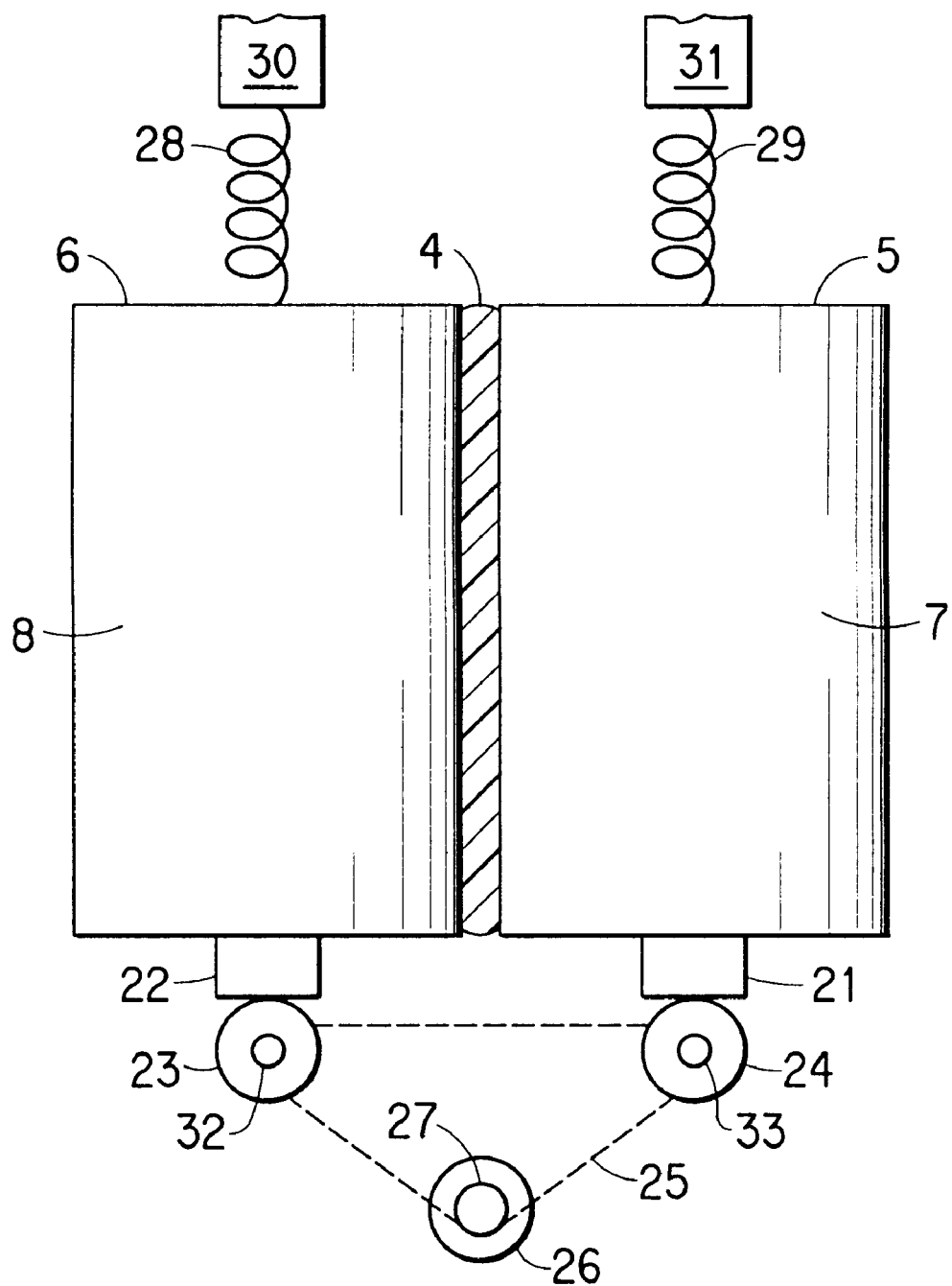
FIG. 3 shows another method of oscillating rollers 5 and 6, and the view is the same as FIG. 2. Rollers 5 and 6 have extensions 21 and 22 respectively. Cams 23 and 24 contact extensions 21 and 22 respectively. Cams 23 and 24 are attached to shafts 33 and 32 respectively, which are driven by toothed belt or chain 25. The belt or chain 25 is driven by motor 26. Cams 23 and 24 are arranged so that they will oscillate rollers 5 and 6 in opposite directions. Springs (or their equivalent) 29 and 28 push against fixed points 30 and 31 respectively, and against rollers 5 and 6 respectively, thereby assuring that 21 and 22 ride against cams 23 and 24 respectively.

In FIG. 2, removal of one of the pins 19 or 20 would clearly cause only one of 5 or 6 to oscillate. Similarly, in FIG. 3, removal of one of cams 23 or 24 would cause oscillation of only one of rollers 5 and 6. Oscillation of only one roller is also useful in this invention, since the rollers are still oscillating with respect to one another parallel to their axis of rotation.

DETAILS OF THE INVENTION

The polymers used herein are fed to the oscillating rollers in the form of molten films. By molten is meant the polymers are above their glass transition temperature and essentially free of crystallites (but still liquid crystalline in the case of an LCP). They will usually be above their melting point (if any). The molten films may be provided by any expedient means, for instance melting preexisting films and feeding them to the rolls, or more conveniently melting the polymers in individual extruders and extruding the polymers through separate ordinary film dies. It is most convenient to vertically extrude the films downward, so that they "fall" by gravity towards the rollers. Alternatively, the multilayer film may be extruded as a "single" entity by using the standard coextrusion method for making multilayer film, and the molten multilayer film fed to the oscillating rollers.

The rollers employed can preferably be heated (see below). The axis of rotation of both rollers will usually be parallel to each other, and the gross surface of each roller will usually be parallel to the axis of rotation of that roller, and at a constant distance from that axis. Typically the rollers will be of metal construction. For convenience the gap between the rollers should preferably be adjustable so that films or sheets of different thicknesses may be readily produced. The rollers are of course driven so that the molten polymers are drawn into the gap between the rollers. The speed of the rollers is preferably adjustable so that the rate that the multilayer film exits the rollers is preferably approximately equal to the total rate of molten polymers fed to the rollers, except as noted below. The rollers are both preferably the same diameter and/or are both driven at the same surface speed through the gap.

The surfaces of the rollers may be embossed with a pattern that is designed to put at least some transverse shear on the polymer as it goes through the nip of the rollers which are oscillating with respect to one another. The angle of the embossing with respect to the axis of oscillation should be greater than 0°. Generally speaking as this angle goes from 0° to 90° the amount of transverse shear imparted to the polymer film increases. Likewise, the deeper the embossing and/or the sharper the ridges of the embossing the greater the transverse shear imparted to the polymer film. Typical depths of embossing are about 0.02 to about 0.15 mm, but this of course is dependent on the angle of embossing and sharpness of the ridges. Useful embossing patterns are readily ascertainable with minimal experimentation by the artisan, and some useful patterns are described in the Examples.

The temperature of at least one the rollers should be such that the surface of the polymer which contacts that roller freezes or solidifies rapidly as the polymer film contacts that roller. This will normally be somewhere below the melting point of the polymer used, or if the polymer is amorphous at ambient temperature, below the glass transition temperature.

The temperature of the second roller is such that a relatively small rolling bank of polymer which is molten or at least mobile is formed in the nip on the second roller's side of the films as they enter the nip, and in the nip at least part of the polymer is molten or at least mobile. As the multilayer film exits the nip both surfaces are essentially solid, although some of the polymer in the interior of the film may yet be molten.

In addition, the temperature of the rollers should be below the point at which the film exiting the rollers sticks to the rollers. It has been found that at least in some cases both rollers may be at the same temperature. A suitable temperature range for each or both rollers is determined in part by the process conditions, such as the speed at which the rollers operate, the thickness of the film, the temperature of the polymers coming into the rollers, the tendency of the polymers to stick to the particular surface of the rollers used, and other factors. The operable temperature range for the rollers may be readily determined by minimal experimentation, and such temperatures are illustrated in the Examples. In actual operation, the temperature of the two rollers may be (nominally) the same or somewhat different.

Heating of the rollers can be accomplished by a number of methods known to the art, such as by hot oil or electrically. It is preferred that the roller temperatures can be controlled relatively accurately (e.g., within 1 to about 2° C.) so that uniform film may be produced.

Preferred total film thicknesses, both entering and exiting the rollers are about 0.02 to about 0.25 mm. Generally speaking tie layers will tend to be thinner than the layers they bind together.

The rollers are oscillated with respect to one another parallel to their axis of rotation. One or both rollers may actually move in this direction (oscillate), or just one roller may oscillate and the other may be fixed in this respect (but still rotate). It has been found that a frequency of oscillation of about 20 to about 200 Hz is a useful range, preferably about 30 to about 150, more preferably about 60 to about 100 Hz whether one or both rollers is actually moved. The amplitude of oscillation can be about 0.5 to about 8 mm, preferably about 1.5 to about 6 mm, this amplitude being the total motion of the two rollers with respect to each other parallel to their axis of rotation.

Figure 1:
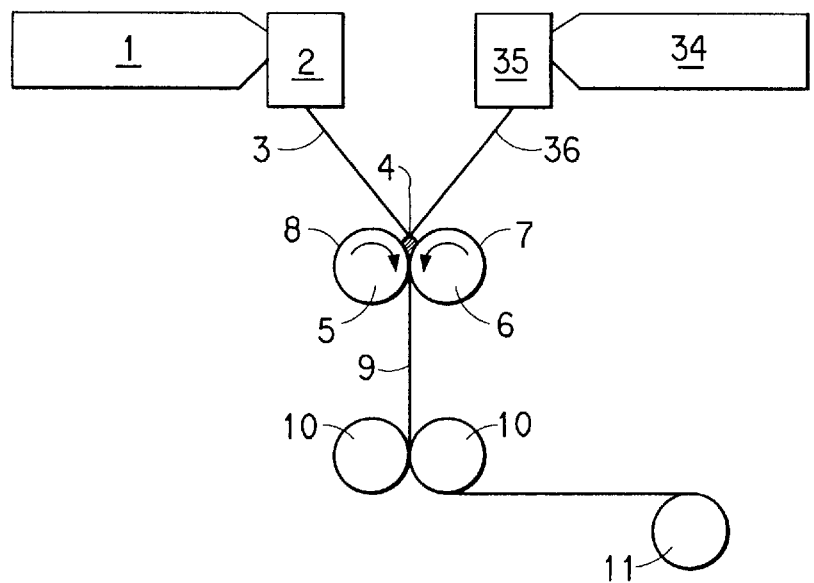
FIG. 1 is a schematic drawing from the side, of an apparatus for carrying out the multilayer film forming process described herein. An extruder, 1, supplies molten first thermoplastic to slit die 2 from which issues a molten first thermoplastic film 3. A second extruder, 34, supplies molten second thermoplastic to slit die 35 from which issues a molten send thermoplastic film. These molten films, 3 and 36, fall vertically until they contact approximately simultaneously embossed surfaces 7 and 8 of rollers 5 and 6, respectively. Rolling bank 4 of thermoplastic is also present. Rollers 5 and 6 are driven in rotation in the directions shown. Multilayer film 9 exits the gap from between rollers 5 and 6, goes between (optional) cooling rollers 9 and 10, and is wound up on windup roll 11.

The multilayer film made herein has at least two layers, but may contain more than two layers. For each layer desired it is convenient to have a separate extruder and film die feeding a molten thermoplastic to the rollers, as illustrated in FIG. 1. These additional layers may be tie layers, or may have other purposes in being in the multilayer film, such as certain barrier properties, abrasion resistance, chemical resistance, appearance, etc.

The thermoplastics used herein may be filled or otherwise mixed with ingredients normally found in thermoplastics, such as filler, reinforcing agents, dyes, pigments, antioxidants, antiozonants, lubricants, etc. Each layer may contain its own distinctive additive(s), or contain no additive at all.

Often when two different polymer are laminated together either when "solid" or in the molten state, after the laminating pressure is removed (and the polymers solidified if applicable) it is found that the adhesion of one polymer to the other is poor. It is believed in the art that the basic cause of this problem is that different polymers tend not to wet each other, resulting in weak bonds between them. To overcome this problem, adhesives have been developed bond different polymers together. In forming multilayer thermoplastic films by extrusion this adhesive often takes the form of a so-called tie layer, which is itself a polymer with improved adhesion to each of the polymers it will be bonding. To obtain improved adhesion to both polymers the tie layer typically is composed of a polymer which is similar in some way to each of the polymers to be adhered and/or contains functional groups which react with other groups in both polymers to be adhered.

However tie layers are expensive to include in multilayer films because their polymers tend to be expensive, and another layer must be extruded, making the process more complicated. It has been found that even without a tie layer the oscillating rolls increase the adhesion between two polymer layers. The reason for this is unclear, but it is suspected that the movement of the polymer in the roller nip may mix the polymers to an extent that they are somewhat physically interlocked at the polymer interface leading to a better bond between polymer layers.

It has also been found that if more improved adhesion is desired a tie layer may be a simple blend of the two polymer being adhered. This blend may be made by simply mixing the two polymers in the extruder which is used to form the film, but the blend is preferably made by melt blending the two polymers beforehand, as in a twin screw extruder. Although the use of this tie layer does require more equipment for the multilayer extrusion, the polymers in the tie layer are often relatively inexpensive, and they don't introduce more ingredients into the multilayer film, an important consideration when the film is to be used for food contact or medical purposes.

If the two polymers to be adhered are A and B, the weight ratio of A:B can be 1:99 to 99:1, preferably about 80:20 to about 20:80, more preferably about 65:35 to about 35:65.

The process of forming multilayer films with the oscillating rollers is particularly useful when at least one of the films is a liquid crystalline polymer (LCP). By an LCP is meant a polymer that is anisotropic when tested in the TOT Test described in U.S. Pat. No. 4,118,372. As mentioned above, when LCPs are extruded through a simple slit film die, they tend to be oriented in the machine (extrusion) direction (MD), which makes them weak in the transverse (perpendicular) direction (TD). As more and more transverse orientation is induced in the LCP, the physical properties in the transverse direction, such as tensile strength, tensile modulus and tensile strain to break will also increase. This increase is often, although not necessarily, at the expense of the machine direction properties. The oscillating rollers can be used to induce more TD orientation in the LCP layer.

Numerous variables may affect the degree of transverse orientation of the LCP in the final film. Among these are roller oscillation frequency, roller rotational speed, roller temperature, type of roller surface (for instance smooth or embossed), roller oscillation frequency, LCP melt temperature, LCP viscosity, and the film thickness.

It is believed that in many cases, as the following are increased, the TD orientation is affected as noted:
- increasing roller oscillation frequency—increases TD orientation (up to a point)
- increasing rotational roller speed—decreases TD orientation
- increasing roller temperature—decreases TD orientation
- increasing roller oscillation amplitude—increases TD orientation
- increasing LCP melt temperature—decreases TD orientation
- increasing LCP viscosity—increases TD orientation
- increasing film thickness—decreases TD orientation In addition, embossing affects the orientation of the resulting LCP film. A roller with a relatively smooth surface may be used, but in this instance the temperature must be controlled very closely, so that this viscosity of the LCP at the roller nip is quite high, but not so high as to prevent the polymer from passing between the rollers. If the rollers are embossed, such tight temperature control is not necessary. Generally speaking the deeper the embossing, or the closer to perpendicular to the oscillation direction the embossing is the embossing is, the more the LCP will be oriented in the TD. Also, if the embossed "lines" have steep walls, as opposed to gently sloping walls, the TD orientation will be increased.

One preferred form of embossing is a diamond knurled patter (see Roll C below), and a double diamond knurled pattern is especially preferred. By double diamond knurled is meant there are two independent diamond knurled patterns present, which leads to diamonds of different sizes embossed on the surface. Many of the above factors will be illustrated in the Examples.

The multilayer LCP films formed by this process have improved transverse direction properties compared to films that are extruded through a simple slit die. It is preferred that the maximum tensile strength in the TD is at least 50 percent of the maximum tensile strength in the MD, more preferably the TD is at least 75 percent of the maximum tensile strength in the MD. Similarly, it is preferred that the tensile strain at break in the TD is at least 50 percent of the strain at break in the MD, more preferably the TD is at least 75 percent of the tensile strain at break in the MD. Also it is preferred that the tensile modulus (Young's modulus) in the TD is at least 50 percent of the strain at break in the MD, more preferably the TD is at least 75 percent of the tensile modulus in the MD. In simple extrusion through a slit die, these properties are typically much better in the MD than the TD.

LCPs are notoriously difficult to adhere to other polymers, even other LCPs. However when the oscillating rollers are used improved adhesion of an LCP to another polymer has been found. This is especially true if a blend of the LCP and the other polymer to which it is to be bound is used as a tie layer. In this instance it is preferred that the weight ratio of LCP:other polymer is about 80:20 to about 20:80, preferably about 65:35 to about 35:65.

Any thermotropic LCP may be used in this process. Suitable thermotropic LCPs, for example, are described in U.S. Pat. Nos. 3,991,013, 3,991,014 4,011,199, 4,048,148, 4,075,262, 4,083,829, 4,118,372, 4,122,070, 4,130,545, 4,153,779, 4,159,365, 4,161,470, 4,169,933, 4,184,996, 4,189,549, 4,219,461, 4,232,143, 4,232,144, 4,245,082, 4,256,624, 4,269,965, 4,272,625, 4,370,466, 4,383,105, 4,447,592, 4,522,974, 4,617,369, 4,664,972, 4,684,712, 4,727,129, 4,727,131, 4,728,714, 4,749,769, 4,762,907, 4,778,927, 4,816,555, 4,849,499, 4,851,496, 4,851,497, 4,857,626, 4,864,013, 4,868,278, 4,882,410, 4,923,947, 4,999,416, 5,015,721, 5,015,722, 5,025,082, 5,086,158, 5,102,935, 5,110,896, and 5,143,956, and European Patent Application 356,226. Useful thermotropic LCPs include polyesters, poly(ester-amides), poly(ester-imides), and polyazomethines. Preferred thermotropic LCPs are polyesters or poly(ester-amides), and it is especially preferred that the polyester or poly(ester-amide) is partly or fully aromatic.

After passing through the gap in the oscillating rollers the LCP film may be wound up. Before being wound up film may go through rolls which may accomplish other functions, such as cooling the film, or calendering the film to obtain a smoother surface.

The multilayer films described herein are useful in many applications, such as for packaging films, bottles and other containers, for encapsulating electronic components, and for use in heat exchangers.

EXAMPLE

Polymer A was a liquid crystalline polymer which was an aromatic polyester, and was a copolymer of (molar ratios in parentheses): 4,4'-biphenol(26.3)/hydroquinone(26.3)/1,6-hexanediamine(47.4)/terephthalic acid(36.8)/2,6-naphthalene dicarboxylic acid(63.2)/4-hydroxybenzoic acid (89.5)/6-hydroxy-2-napthoic acid(36.8).

Polymer B was a nylon 6/Sclair® 11K1[a]/Fusabond® D226[b]/a functionalized synthetic rubber[c] (72.5/13.6/6.8/6.8 weight percent ([a]LLDPE available from Nova Chemicals, Calgary, Alberta, Canada; [b]A maleic anhydride grafted LLDPE available from E. I. duPont de Nemours & Co., Wilmington, Del. U.S.A.; °A maleic anhydride functionalized EPDM.)

Polymer C was a blend prepared in a twin screw extruder of 40 percent by weight of Polymer A and 60 percent by weight of Polymer B.

The apparatus used included a ¾" (1.91 cm) Brabender (Type 2003, C. W. Brabender Instruments, Hackensack, N.J., U.S.A.), a 1" (2.54 cm) Wilmod extruder, and a 3.8 cm NRM extruder. Polymer A was extruded from the Wilmod extruder running at 45 rpm and the melt temperature was 280° C. Polymer B was extruded from the NRM extruder running at 20 rpm and at a melt temperature of 280° C. Polymer C was extruded from the Brabender extruder running at 60 rpm and with a melt temperature of 270° C. The output of each of these extruders was fed to 15.2 cm wide film die which was configured to handle three separate feeds. Polymers A and B were the outside layers and Polymer C was the inner layer.

The molten film fell by gravity on the oscillating rollers, which were arranged as shown in FIGS. 1 and 2, except the 3 extruders fed the 3 polymer films to a single film die. The rollers were 8.9 cm in diameter and 20.3 cm wide, and the surfaces were faced with stainless steel which were embossed with a diamond or knurled pattern, about 50–75 m deep, with a 90° included angle for the sides, with the knurling lines at an angle of 30° to the axis of rotation of the roll. The rotational speeds of the rollers were manually controlled using a variable speed drive motor and was set so the surface speed of the rolls was 6 m/min. The rate of oscillation was also manually controlled by a variable speed drive motor and was 50 Hz, while the amplitude of oscillation could be varied by changing the cam 17, and was 1.3 mm. Each roller was individually heated by Calrod® electrical heaters, which were in turn automatically controlled by digital controllers. It is believed that the roller temperatures could be maintained to about ±1° C., and the roller temperatures were 177° C. After passing through the oscillating rollers the film was passed through a set of cooling rolls and then rolled up on a roll.

In the beginning of the run, the speed of extrusion and rotation of the oscillating rollers were adjusted so that a rolling bank of the polymer built up on the oscillating rollers, and then the speed of the oscillating rollers was set as closely as possible to maintain a constant sized rolling bank. Occasionally some manual adjustments were needed.

In the resulting film, the Polymer A layer was about 0.051 mm thick, the Polymer B layer was about 0.10 mm thick and the Polymer C layer was about 0.051 mm thick.

What is claimed is:

1. A process for the production of a multilayer thermoplastic film, comprising, feeding a molten first film of a first thermoplastic polymer and a molten second film of a second thermoplastic polymer to a pair of rollers which have a gap between them which is approximately equal to the total thickness of said first film and said second film, and passing said first film and said second film through said gap, provided that:

said rollers oscillate relative to one another and along their rotational axis at a frequency of about 20 to about 200 Hz;

said rollers are at such a temperature or temperatures that said first film or said second film freezes against one roller, and on the other roller a rolling bank of molten polymer is formed;

and provided that at said temperature or temperatures and said frequency a multilayer thermoplastic film is formed.

2. The process as recited in claim 1 wherein more than two layers of thermoplastic are present in said multilayer film.

3. The process as recited in claim 1 wherein said frequency is about 60 to about 100 Hz.

4. The process as recited in claim 1 wherein a surface of said rollers is embossed in a pattern.

5. The process as recited in claim 4 wherein said pattern is diamond knurled or double diamond knurled.

6. The process as recited in claim 1 wherein an amplitude of said oscillation is about 0.5 to about 8 mm.

7. The process as recited in claim 3 wherein an amplitude of said oscillation is about 1.5 to about 6 mm.

8. The process as recited in claim 5 wherein an amplitude of said oscillation is about 1.5 to about 6 mm.

9. The process as recited in claim 1 wherein at least on or said thermoplastic layers is a liquid crystalline polymer.

10. The process as recited in claim 2 wherein at least on or said thermoplastic layers is a liquid crystalline polymer.

11. The process as recited in claim 10 wherein said thermotropic liquid crystalline polymer is a polyester or a poly(ester-amide).

12. The process as recited in claim 2 wherein at least one of such layers is a tie layer.

13. The process as recited in claim 10 wherein at least one of such layers is a tie layer.

14. The process as recited in claim 13 wherein said tie layer is a blend of said liquid crystalline polymer and a third polymer to which said liquid crystalline polymer is to be adhered, provided that the weight ratio of said liquid crystalline polymer to said third polymer is about 99:1 to about 1:99.

15. The process as recited in claim 14 wherein said weight ratio is about 65:35 to about 35:65.

16. The process as recited in claim 1 wherein a total thickness of said multilayer film is about 0.02 mm to about 0.25 mm.

* * * * *